US00RE36580E

United States Patent [19]

Bogosian, Jr.

[11] E Patent Number: Re. 36,580

[45] Reissued Date of Patent: Feb. 22, 2000

[54] SYSTEM FOR VERIFYING USE OF CREDIT/IDENTIFICATION CARD INCLUDING RECORDING PHYSICAL ATTRIBUTES OF UNAUTHORIZED USERS

[75] Inventor: Charles A. Bogosian, Jr., Warwick, R.I.

[73] Assignee: Wizards, LLC, Del.

[21] Appl. No.: 09/069,371

[22] Filed: Apr. 29, 1998

Related U.S. Patent Documents

Reissue of:

[64] Patent No.: 5,513,272
Issued: Apr. 30, 1996
Appl. No.: 08/349,688
Filed: Dec. 5, 1994

[51] Int. Cl.[7] ..... G06K 9/00

[52] U.S. Cl. ..... 382/116; 340/825.34; 235/382; 704/272

[58] Field of Search ..... 382/115, 116, 382/117, 124; 340/825.3, 825.33, 825.34; 348/150; 283/75, 78, 904; 235/380, 382; 356/71; 704/235, 243, 246, 272, 273

[56] References Cited

U.S. PATENT DOCUMENTS

| | | | |
|---|---|---|---|
| 4,179,686 | 12/1979 | Bonicalzi et al. | 340/146.3 AG |
| 4,582,985 | 4/1986 | Löfberg | 235/380 |
| 4,636,622 | 1/1987 | Clark | 235/380 |
| 4,805,223 | 2/1989 | Denyer | 382/4 |
| 4,811,408 | 3/1989 | Goldman | 382/2 |
| 4,972,476 | 11/1990 | Nathans | 380/23 |
| 4,993,068 | 2/1991 | Piosenka et al. | 380/23 |
| 4,995,086 | 2/1991 | Lilley et al. | 382/4 |
| 5,053,608 | 10/1991 | Senanayake | 235/380 |
| 5,071,168 | 12/1991 | Shamos | 283/117 |
| 5,180,901 | 1/1993 | Hiramatsu | 235/380 |

*Primary Examiner*—Andrew W. Johns
*Attorney, Agent, or Firm*—Barlow, Josphes & Holmes, Ltd.

[57] ABSTRACT

The present invention is directed to a method and apparatus for verifying an authorized user of a credit/identification card. The method includes the steps of scanning the card with an apparatus having a plurality of scanning devices for scanning a bar code, scanning the card for evidence of tampering, scanning at least one fingerprint on the card, and any other detectable information, and comparing the scanned information on the card to information of the owner stored on at least one accessible database in communication with the apparatus. Data transmissions between the apparatus and databases are protected by an encryption system. If the information on the card does not match the information germane to the owner of the card which is stored in the database, the card is withheld from the user. Otherwise, the user of the card is free to use it for a desired purpose.

70 Claims, 3 Drawing Sheets

SYSTEM FOR VERIFYING USE OF CREDIT/IDENTIFICATION CARD INCLUDING RECORDING PHYSICAL ATTRIBUTES OF UNAUTHORIZED USERS

Matter enclosed in heavy brackets [ ] appears in the original patent but forms no part of this reissue specification; matter printed in italics indicates the additions made by reissue.

BACKGROUND AND SUMMARY OF THE INVENTION

This invention relates generally to methods and apparatuses for verifying an authorized user of a credit and/or identification card, and more particularly to a method and apparatus which utilizes a plurality of scanning stations for verifying the authorized user of the card.

Recently, attempts have been made to develop systems for preventing the unauthorized use of credit cards. These systems typically utilize various devices for authenticating the identity of the user of such cards. One such system has been to provide on the face of the card a fingerprint of the owner of the card wherein the user's fingerprint must match the fingerprint on the card. The concept of utilizing fingerprint identification as verification for the authenticity of a credit/identification card is well-known. U.S. Pat. No. 4,582,985 (Lofberg) and U.S. Pat. No. 5,180,901 (Hiramatsu) each disclose a typical identifying system. However, fingerprint identification requiring the user's fingerprint to be compared to a fingerprint of the owner on the card suffers from the disadvantage that the credit card may easily be tampered with, e.g., the owner's fingerprint is replaced by the fingerprint of the unauthorized user.

Other methods of identifying authorized users of cards also suffer from the same disadvantage. For example, U.S. Pat. No. 4,995,086 (Lilley et al.) discloses a verification system whereby a bar code having information about the owner of the card is provided on the card and compared to information kept on a database which communicates with the system. Like fingerprint identification, the bar code which is applied on the surface of the card can be tampered with.

Presently, there is a need for a method and apparatus for verifying an authorized user of a credit/identification card which can detect whether the card has been altered so that an unauthorized user is prevented from using the card.

Among the several objects of the present invention are the provision of an improved method for verifying an authorized user of a credit/identification card which is capable of detecting whether the card has been tampered with or changed; the provision of such an improved method having several cross-checking steps which substantially ensure authorized use of the card; the provision of such a method capable of verifying whether a fingerprint of the user of a card matches a fingerprint of the owner of the card; the provision of such a method capable of verifying whether a voice print of the user of the card matches a voice print of the owner of the card; the provision of such a method capable of verifying whether a retinal print of the user of the card matches a retinal print of the owner of the card; the provision of such a method which withholds the card from an unauthorized user; and the provision of such a method which is capable of recording a fingerprint of an unauthorized user.

Also among the several objects of the present invention are the provision of an improved apparatus for verifying an authorized user of a credit/identification card; the provision of such an apparatus which is capable of detecting whether the card has been tampered; the provision of such an apparatus having several scanning devices for substantially ensuring authorized use of the card; the provision of such an apparatus having a fingerprint scanning device and associated means for verifying whether a fingerprint of the user of the card matches a fingerprint of the owner of the card; the provision of such an apparatus having a microphone and associated means for verifying whether a voice print of the user of the card matches a voice print of the owner of the card; the provision of such an apparatus having a retinal scanning device and associated means for verifying whether a retinal print of the user of the card matches a retinal print of the owner of the card; the provision of such an apparatus which withholds the card from an unauthorized user; the provision of such an apparatus which is capable of recording a fingerprint of an unauthorized user; and the provision of such an apparatus which encrypts data transmission when communicating with a central database.

In general, a method for verifying an authorized user of a credit/identification card comprises the steps of:

(a) inserting the card into an apparatus having a plurality of scanning:stations, the card including a surface having a strip thereon which has information germane to the owner of the card, such as an identification number and other personal data, and at least one fingerprint thereon of the owner of the card;

(b) scanning the strip of the card at an information strip scanning station of the apparatus for verifying the information of the card including the identification number;

(c) comparing the information stored on the strip of the card to information of the owner stored on at least one accessible database in communication with the apparatus, the apparatus withholding the card from the user if the information on the card does not match the information germane to the owner of the card which is stored in the database;

(d) scanning the surface of the card at a graphic scanning station of the apparatus which digitizes the surface of the card by imaging every line thereof;

(e) converting the image of the surface of the card to a digital numeric sequence;

(f) comparing the surface of the card as scanned by the graphic scanning device and converted to a digital numeric sequence to a digital numeric sequence stored in the database for determining whether the card has been tampered with, the apparatus withholding the card from the user if the surface of the card does not match the surface of the card stored by the database;

(g) obtaining a fingerprint of the user;

(h) scanning the fingerprint of the user at a fingerprint scanning station; and (i) comparing the fingerprint of the user to the fingerprint on the card and to a fingerprint of the owner of the card in the database to ensure authorized use of the card, the apparatus withholding the card from the user if the fingerprint scanned by the fingerprint scanning device does not match the fingerprints on the card and in the database, whereby, upon matching the user's fingerprint to the fingerprints on the card and in the database for ensuring the user of the card is the owner of the card, the apparatus allowing the user to use the card for a desired purpose.

An apparatus for carrying out the method of the present invention comprises an information strip scanning device for scanning the information strip of the card and means for comparing the information contained in the strip to information of the owner stored on at least one accessible database in communication with the apparatus. The apparatus withholds the card from the user if the information on the card does not match the information germane to the owner of the card which is stored in the database. The apparatus and database include encryption means for encrypting data transmissions between the apparatus and the database. A graphic scanning device scans the surface of the card in which the graphic scanning device digitizes the surface of the card by imaging every line thereof. Suitable means converts the image of the surface of the card to a digital numeric sequence and means compares the surface of the card as scanned by the graphic scanning device and converted to a digital numeric sequence by the converting means to a digital numeric sequence stored in the database for determining whether the card has been altered. The apparatus withholds the card from the user if the surface of the card does not match the surface of the card stored by the database. A fingerprint scanning device having a pad upon which the user of the card presses with a finger for obtaining a fingerprint of the user scans the fingerprint of the user, and suitable means compares the fingerprint of the user to the fingerprint on the card and to a fingerprint of the owner of the card in the database to ensure authorized use of the card. The apparatus withholds the card from the user if the fingerprint scanned by the fingerprint scanning device does not match the fingerprints on the card and in the database. Thus, upon matching the user's fingerprint to the fingerprints on the card and in the database for ensuring the user of the card is the owner of the card, the apparatus allows the user to use the card for a desired purpose.

Other objects, features and advantages of the invention shall become apparent as the description thereof proceeds when considered in connection with the accompanying illustrative drawings.

BRIEF DESCRIPTION OF THE DRAWINGS:

In the drawings which illustrate the best mode presently contemplated for carrying out the present invention.

Corresponding reference numerals designate corresponding parts throughout the several views of the drawings.

Figure 2:
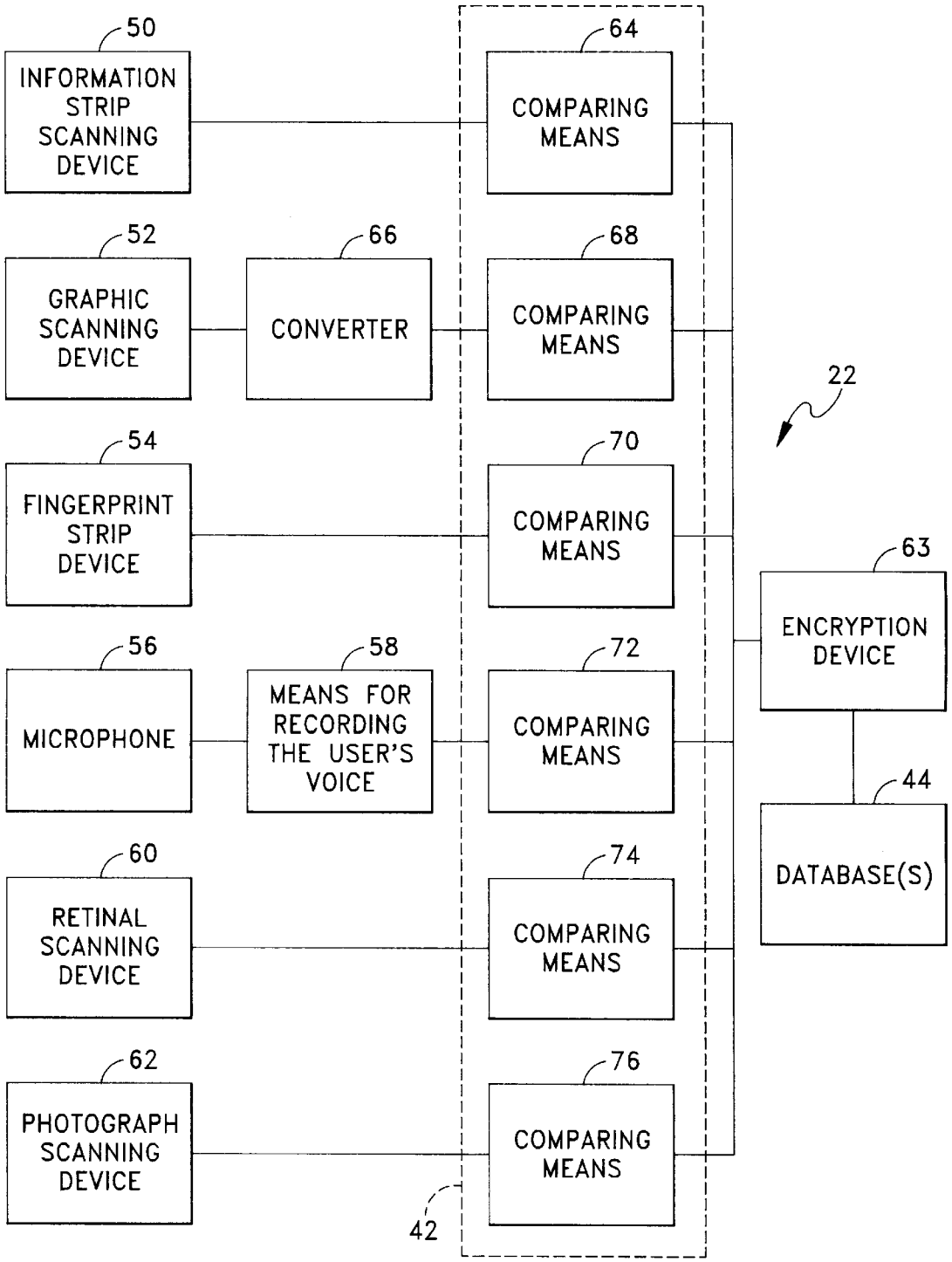
FIG. 2 is a block diagram of an apparatus for carrying out the method of the present invention.
Figure 3:
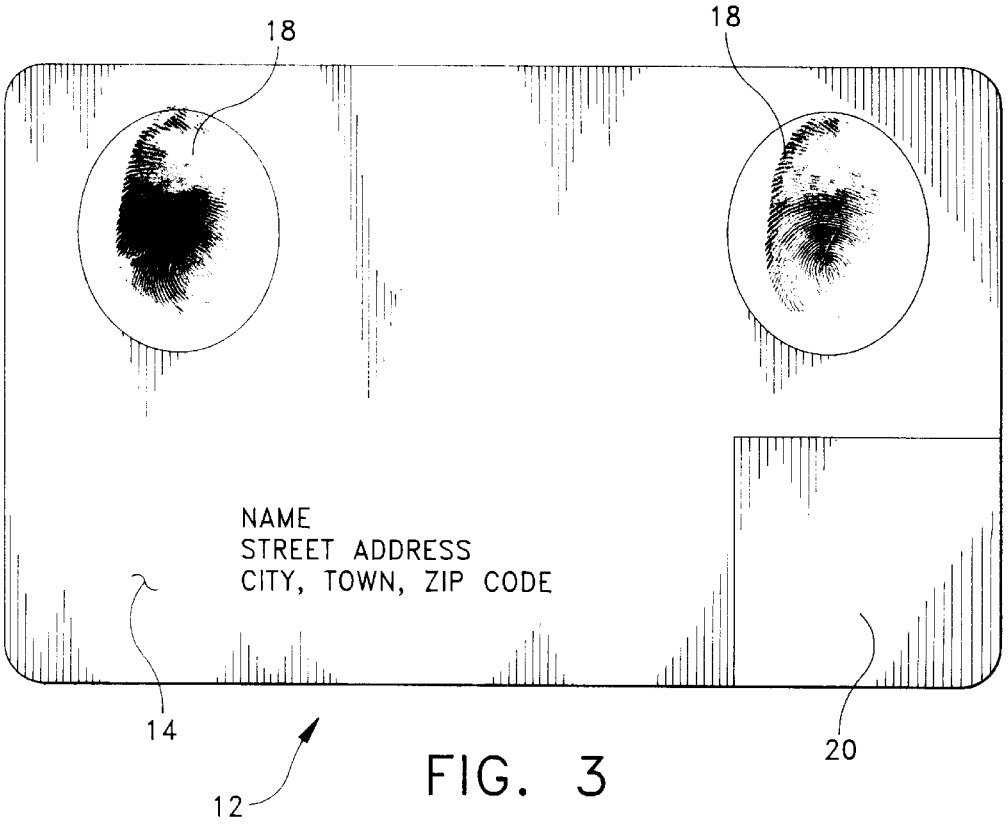
FIG. 3 is a credit card of the present invention.
Figure 4:
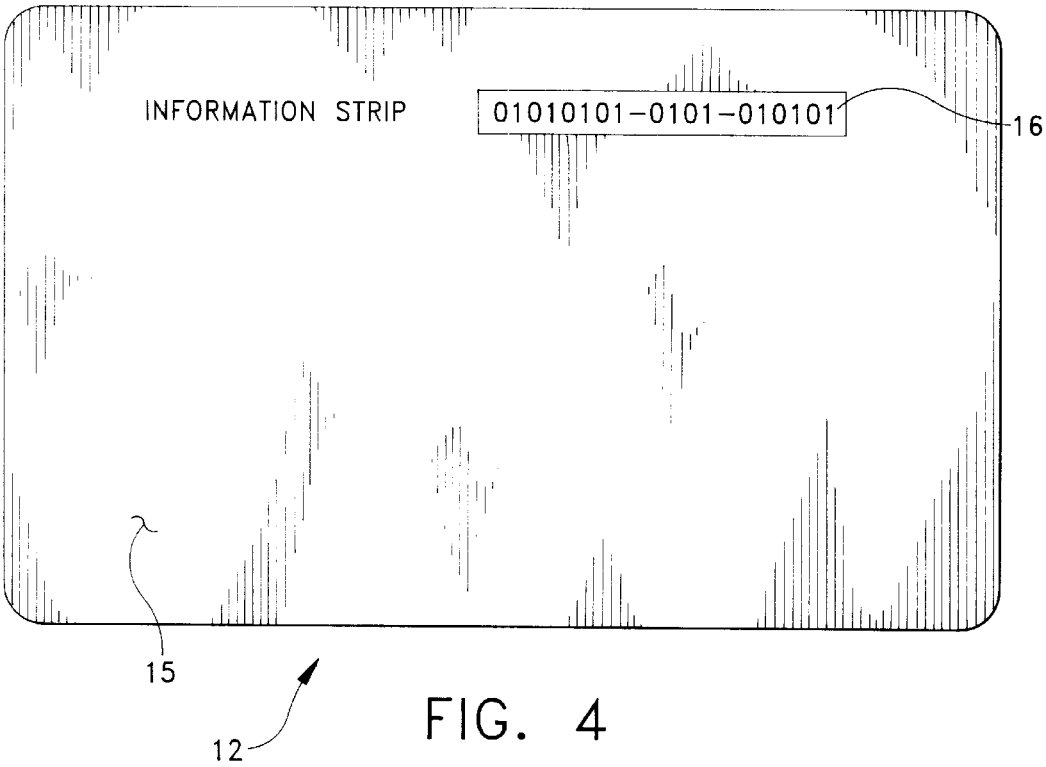
FIG. 4 illustrates the reverse side of the credit card shown in FIG. 3.

DETAILED DESCRIPTION OF THE PREFERRED EMBODIMENT:

Referring now to the drawings, there is generally indicated at 10 a method (illustrated in FIG. 1) for verifying the authorized user of a credit and/or identification card (illustrated in FIG. 3), generally indicated at 12. Preferably, the card 12 should include a surface 14 having at least one fingerprint 18 imprinted thereon of the owner of the card 12. The card preferably has a reverse side.15 (FIG. 4) which has an information strip 16 such as a bar code or magnetic strip, imprinted thereon which has information germane to the owner of the card, such as an identification number and other personal data. The information strip 16.and fingerprint 18 may be imprinted directly onto the card 12 and protected by any suitable laminate as is well-known in the art. As illustrated in FIG. 3, the card 12 has two fingerprints 18 of the owner of the card imprinted on surface 14. The card 12 may also include other information, such as a photograph 20 of it's owner and the name and address of the owner. It should be understood that the method 10 of the present invention is applicable to any situation where it is desired to verify or authenticate that the user of the card 12 is the owner of the card. The method of the present invention is especially suited to verifying users of credit cards. The method 10 may also be used to verify the identity of authorized persons desiring access to a restricted area (e.g., hospitals, corporate research facilities, etc.). FIG. 2 illustrates an apparatus generally indicated at 22, for carrying out the method of the present invention, the apparatus 22 being described in detail after the description of the method 10 of the present invention.

Figure 1:
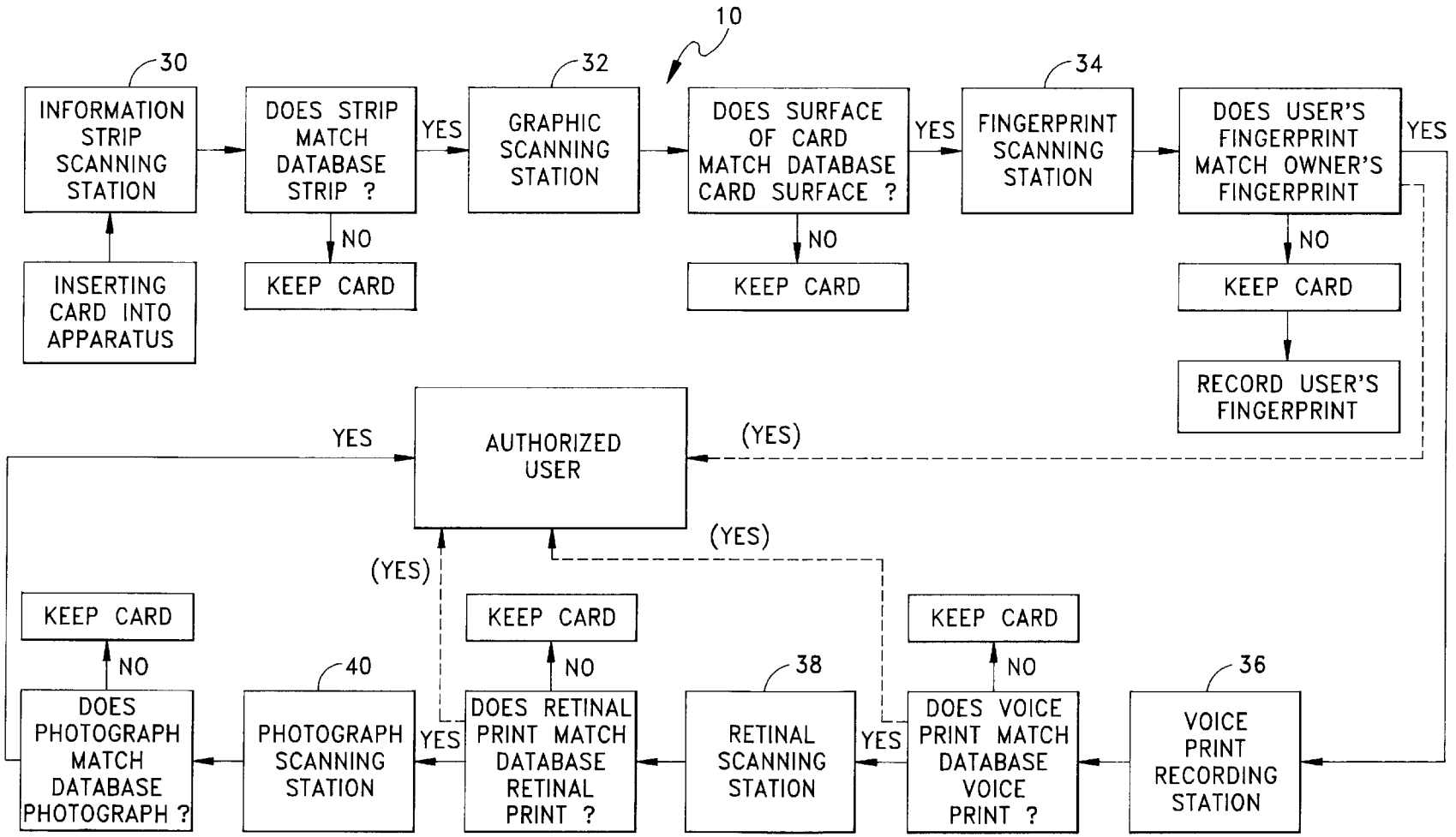
FIG. 1 is a flow chart illustrating a method for verifying an authorized user of a credit and/or identification card of the present invention.

Referring now to FIG. 1, method 10 initially comprises the step of inserting the card 12 into an apparatus, such as apparatus 22, having a plurality of scanning stations, namely an information strip scanning station 30, a graphic scanning station 32, a fingerprint scanning station 34, a voice print recording station 36, a retinal scanning station 38, and a photograph scanning station 40. As will be described in greater detail below, the apparatus 22 may embody any number of designs, so long as it is capable of performing the respective verification steps of the method 10.

After being inserted into the apparatus 22, the card 12 enters an information strip scanning station 30 for scanning the strip 16 of the card 12 to verify the information of the card 12 including the identification number. This information is sent to a microprocessor 42 (FIG. 2) which compares the information stored on the information strip 16, to include the card owner's identification number, to information of the owner stored on at least one accessible database 44 (FIG. 2) in communication with the microprocessor 42 of the apparatus 22. In order to insure complete security of data transmissions between the apparatus and the database, both the apparatus and database preferably include encryption devices for encrypting and decrypting data transmission. If the information on the strip 16 of the card 12 matches the information stored in the database 44 for that particular card, the card 12 is examined by the next station (i.e., the graphic scanning station 32). However, the apparatus 22 withholds the card 12 from the user if the information on the card does not match the information germane to the owner of the card which is stored in the database 44. The card 12, if confiscated, may be stored in any suitable compartment of the apparatus 22 until the apparatus is serviced in which the cards 12 presented by unauthorized users and confiscated by the apparatus 22 may be properly addressed.

Next, the card 12 is examined by a graphic scanning 32 station in which the surface 14 of the card 12 is digitized by imaging every line thereof. The purpose of examining the surface 14 of the card 12 is to determine whether it has been altered. The image of the surface 14 of the card 12 is converted to a digital numeric sequence which is sent to the microprocessor 42 which compares the digital numeric sequence of representing the surface of the card to information directed to a prior scan of the card which is stored on the aforementioned database 44 or another accessible database in communication with the microprocessor 42 of the apparatus 22. If the digital numeric sequence of the card 12 matches the digital numeric sequence stored in the database for that particular card, the card 12 is examined by the next station. However, the apparatus 22 withholds the card 12 from the user if the digital numeric sequence of the card does not match the digital numeric sequence which is stored in the database 44. As with the information scanning station 30, the card 12 may be stored in any suitable compartment of the apparatus 22 until the apparatus is serviced in which the cards presented by unauthorized users and confiscated by the apparatus may be properly addressed.

As illustrated in FIG. 1, the card 12 is next examined by a fingerprint scanning station 34. This step of the method 10 of the present invention requires the user of the card 12 to provide a fingerprint 18 which is compared to the fingerprint 18 on the card 12 and to a fingerprint of the owner of the card in the aforementioned database 44, or a separate accessible database in communication with the microprocessor 42 of the apparatus 22, to ensure authorized use of the card 12. As with the information strip and graphic scanning stations 30, 32, the apparatus 22 withholds the card 12 from the user if the fingerprint scanned by the fingerprint scanning station does not match the fingerprints on the card and in the database 44. If the fingerprint of the user matches the fingerprints on the card 12 and in the database 44, the apparatus 22 may allow the user to use the card 12 for a desired purpose, or, as illustrated in FIG. 1, the card 12 may be examined by subsequent stations if a more exacting level of verification is required.

In the event that the user does not match the fingerprint 18 on the card 12 or the fingerprint of the owner of the card as stored in the database 44, the method of the present invention further includes the step of recording the fingerprint of the user. The purpose of this additional step is to obtain evidence which could possibly be used to identify the unauthorized user of the card. The recorded fingerprint of the unauthorized user could be compared to fingerprints stored in other databases, such as criminal file databases, employee databases, etc.

As mentioned above, if additional verification is necessary, the card 12 may be examined by the voice print recording station 36, the retinal scanning station 38 and the photograph scanning station 40. It should be understood that any of these additional scanning steps may be performed separately, or in any combination, and still fall within the scope of the present invention.

Referring still to FIG. 1, the method 10 of the present invention may require the user of the card 12 to speak into a voice print recording station 36 of the apparatus 22 for obtaining a voice print of the user. This voice print is digitized and sent to the microprocessor 42 where it is compared to a voice print of the owner of the card 12 which is stored in the database 44, or a separate accessible database in communication with the microprocessor 42. As with the other stations, if the voice print of the user does not match the voice print of the owner stored in the database 44, the apparatus 22 withholds the card 12 until it is properly disposed of, otherwise, the apparatus 22 may allow the user to use the card 12 for a desired purpose, or the card 12 may be examined by subsequent stations if a more exacting level of verification is required.

Accordingly, method 10 also may require the user of the card 12 to look into a retinal scanning station 38 of the apparatus 22 for obtaining a retinal print of the user. This retinal print is then sent to the microprocessor 42 where it is compared to a retinal print of the owner of the card which is stored in the database 44, or a separate accessible database in communication with the microprocessor 42. As with the other stations, if the retinal print of the user does not match the retinal print of the owner stored in the database 44, the apparatus 22 confiscates the card. If the retinal print of the user matches the retinal print of the owner stored in the database 44, the apparatus 22 may allow the user to use the card 12 for a desired purpose, or the card 12 may be examined by subsequent photograph scanning station 40.

At the photograph scanning station 40, the photograph 20 on the card 12 is scanned and compared to a photograph of the owner of the card which is stored in the database 44 for additionally ensuring that the card 12 has not been tampered with. This scanning station 40 is preferably more sensitive than the graphic scanning station 32, since the latter is designed to locate the various components of the card 12 rather than the details of the photograph of the owner. Thus, if the photograph 20 of the owner of the card 12 has been replaced by a photograph of the user, and the card passes through the graphic scanning station 32 without being confiscated, the microprocessor 42 will recognize that the photographs do not match whereby the apparatus 22 confiscates the card 12 from the user. If the photographs do match, the apparatus will allow the user to use the card for a desired purpose and the verification process is complete.

Turning now to FIG. 2, there is illustrated the apparatus 22 of the present invention which comprises an information scanning device 50, a graphic scanning device 52, a fingerprint scanning device 54, a microphone 56 and means 58 for digitizing a person's voice, a retinal scanning device 60 and a photograph scanning device 62. The microprocessor 42 obtains the information gathered by these devices and compares it to information stored on the database 44, or, as mentioned above, a plurality of separate databases in communication with the microprocessor 42. The apparatus 22 and databases 44 preferably include encryption devices 63 for encrypting and decrypting data transmissions therebetween. The encryption devices 63 effectively prevent someone from tapping into the telephone lines to illegally steal or copy the digital transmissions during the verification process. Encryption devices 63 of the type contemplated are manufactured by Datotek, Inc. of Dallas, Tex. The apparatus 22 may embody different forms, however, it is envisioned that it would be constructed similarly to an automatic teller machine ("ATM") or the like which is designed to receive and process cards.

More specifically, the information strip scanning device 50 is provided for scanning a bar code or magnetic strips of the card 12. As illustrated, the microprocessor 42 includes means 64 for comparing the information contained in the strip 16 of the card 12 (to include the card owner's identification number) to information of the owner stored on the database 44. If the information on the card 12 does not match the information of the database 44, the apparatus 22 confiscates the card 12. The information strip scanning device 50 may be any of the commercially available scanners for scanning bar codes, such as a scanner sold by Symbol Technologies, Inc., Bohemia, N.Y. under the model no. PDF 417.

The graphic scanning device 52 scans surface 14 of the card 12 for determining whether the card 12 has been physically altered. A converter 66 (broadly "converting means") is provided for converting the image of the surface 14 of the card 12 to a digital numeric sequence. This digital numeric sequence is sent to the microprocessor 42 which further includes means 68 for comparing the surface 14 of the card 12 as scanned by the graphic scanning device 52 and converted to a digital numeric sequence by the converter 66 to a digital numeric sequence stored in the database 44 (or in another database in communication with the microprocessor 42) for determining whether the card 12 has been tampered with. If the digital numeric sequence which represents the surface 14 of the card 12 does not match the digital numeric sequence of the of the database 44, the apparatus 22 withholds the card 12. The graphic scanning device 52 and converter 66 may be any of the commercially available graphic scanners and converters, such as a scanner manufactured by Hewlett-Packard Corporation of California.

The fingerprint scanning device 54 has a pad (not shown) upon which the user of the card 12 presses with a finger for obtaining a fingerprint of the user. The fingerprint scanning device 54 scans the fingerprint of the user as obtained by the pad and sends it to the microprocessor 42 which includes means 70 for comparing the fingerprint of the user to the fingerprint 18 on the card 12 and to a fingerprint of the owner of the card in the database 44. If the fingerprint 18 of the user of the card does not match the fingerprint 18 on the card 12 or the fingerprint in the database 44, the apparatus 22 withholds the card.

The fingerprint scanning device 54 may also include a recording feature (not shown) in which the fingerprint of the unauthorized user is recorded for later use, such as comparing it to fingerprints in other databases. This recording feature would assist in the apprehension of the unauthorized user.

The fingerprint scanning device 54 may be any of the commercially available fingerprint scanning systems, such as a fingerprint scanner sold by Electronic Data Systems Corp., Dallas, Tex. or the fingerprint scanners disclosed in the Lofberg and Hiramatsu patents.

The apparatus 22 described thus far is capable of achieving the method 10 of the present invention, i.e., capable of comparing the information on the strip 16 of the card 12 to information about the owner on the database 44, determining whether the card 12 has been altered, and comparing the fingerprint of the user with the fingerprint 18 on the card 12 and the fingerprint in the database 44. The apparatus 22 may further include the aforementioned microphone 56 and associated means 58 for recording the user's voice, the retinal scanning device 60 and the photograph scanning device 62 for increasing the level of verification. It should be understood that the apparatus 22 may include each of these additional devices or any combination thereof, depending upon the desired level of verification.

The microphone 56 is for receiving the user's voice when the user speaks therein. A recorder 58 (broadly "means for recording") records the user's voice after the user has spoken into the microphone 56 and converts the analog signals to digital signals for obtaining a voice print of the user. The voice print is sent to the microprocessor 42 which includes means 72 for comparing the voice print of the user to a voice print of the owner of the card which is stored in the database 44, or in another accessible database. If the voice print of the user of the card 12 does not match the voice print in the database 44, the apparatus 22 confiscates the card 12 from the user. The microphone 56, recorder 58, and voice recognition software may comprise any of the commercially available voice recognition systems, such as a voice recognition system sold by Texas Instruments of Dallas, Tex.

The retinal scanning device 60 is for obtaining a retinal print of the user after the user looks into the retinal scanning device 60. The retinal print is sent to the microprocessor 42 which includes means 74 for comparing the retinal print of the user to a retinal print of the owner of the card 12 which is stored in the database 44, or in another accessible database. If the retinal print of the user of the card 12 does not match the retinal print in the database 44, the apparatus 22 withholds the card 12 from the user. The retinal scanning device 60 may be purchased from Ophthalmic Imaging Systems, Inc. of Sacramento, Calif.

Lastly, apparatus 22 includes the photograph scanning device 62 which is for scanning the photograph 20 on the card 12. This scanning device 62 is preferably more sensitive than the graphic scanning device 54, since the latter is designed to locate the main components of the card rather than details of the photograph of the card's owner. This information is sent to the microprocessor 42 which includes means 76 for comparing the photograph 20 as scanned by the scanning device 62 to a photograph of the owner of the card 12 which is stored on the database 44, or on another accessible database, for ensuring that the card 12 has not been tampered with, namely, that the photograph 20 has not been replaced by the photograph of the user. If the photograph 20 on the card 12 does not match the photograph in the database 44, the apparatus 22 withholds the card from the user. The photograph scanning device 62 may also be purchased from Hewlett-Packard Corporation.

The microprocessor 42 of the apparatus 22 may be chosen from any of the commercially available microprocessors wherein the software may comprise a menuing system such as a system designed by Galacticomm, Inc. of Ft. Lauderdale, Fla. It is envisioned that this menuing system, when authorized use of the card is verified, enables the card's user to choose from many options such as credit, banking, money transfer, hospital or health care authorization etc. In this connection, the software may also be designed for a single-purpose use. For example, a hospital may require health care authorization before admission or treatment. The system software could be specifically designed to access and store appropriate data for billing, such as date, type of treatment, location of the facility etc. Other single-purpose applications, such as bank ATM's would access and store different information germane to the purpose. It is also contemplated that a machine code number and location could be coded in a bar code format and affixed inside the apparatus, wherein a separate bar code reader (not shown) would read the bar code and store that information with other information germane to each card transaction.

It should be observed that the method 10 and apparatus 22 of the present invention are capable of verifying the authorized user of a credit/identification card, and of determining whether the card has been altered.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A method for verifying an authorized user of a credit/identification card comprising the steps of:

inserting the card into an apparatus having a plurality of scanning stations, the card including a surface having a strip thereon which has information germane to the owner of the card, such as an identification number and other personal data, and at least one fingerprint thereon of the owner of the card;

scanning the strip of the card at an information strip scanning station of said apparatus for verifying the information of the card including the identification number;

comparing the information stored on the strip of the card to information of the owner stored on at least one accessible database in communication with said apparatus, the apparatus withholding the card from the user if the information on the card does not match the information germane to the owner of the card which is stored in the database;

scanning the surface of the card at a graphic scanning station of said apparatus which digitizes the surface of the card by imaging every line thereof;

converting the image of the surface of the card to a digital numeric sequence;

comparing the surface of the card as scanned by said graphic scanning device and converted to a digital numeric sequence to a digital numeric sequence stored in said database for determining whether the card has been tampered with, the apparatus withholding the card from the user if the surface of the card does not match the surface of the card stored by the database;

obtaining a fingerprint of the user;

scanning the fingerprint of the user at a fingerprint scanning station; and comparing the fingerprint of the user to said fingerprint on the card and to a fingerprint of the owner of the card in the database to ensure authorized use of the card, the apparatus withholding the card from the user if the fingerprint scanned by the fingerprint scanning device does not match the fingerprints on the card and in the database; whereby, upon matching the user's fingerprint to the fingerprints on the card and in the database for ensuring the user of the card is the owner of the card, said apparatus allowing the user to use the card for a desired purpose, said method further comprising the step of recording the fingerprint of the user of the card in the event the fingerprint of the user does not match the fingerprint on the card or the fingerprint of the owner of the card.

2. The method as set forth in claim 1 further comprising the steps of:

requiring the user of the card to speak into a microphone of the apparatus for obtaining a voice print of the user; and comparing the user's voice print to a voice print of the owner of the card which is stored in the database, the apparatus withholding the card from the user if the user's voice does not match the voice print of the owner stored in the database.

3. The method as set forth in claim 2 further comprising the steps of:

obtaining a retinal print of the user at a retinal scanning station; and comparing the user's retinal print to a retinal print of the owner of the card which is stored in the database, the apparatus withholding the card from the user if the user's retinal print does not match the retinal print of the owner stored in the database.

4. The method as set forth in claim 3 further comprising the steps of:

scanning a photograph of the user on the card at a photograph scanning station;

comparing the photograph as scanned by the photograph scanning station to a photograph of the owner of the card which is stored on the database for ensuring that the card has not been tampered with, the apparatus withholding the card from the user if the photograph on the card does not match the photograph stored in the database.

5. The method as set forth in claim 1 further comprising the steps of:

obtaining a retinal print of the user at a retinal scanning station; and comparing the user's retinal print to a retinal print of the owner of the card which is stored in the database, the apparatus withholding the card from the user if the user's retinal print does not match the retinal print of the owner stored in the database.

6. The method as set forth in claim 1 further comprising the steps of:

scanning a photograph of the user on the card at a photograph scanning station; and comparing the photograph as scanned by the photograph scanning station to a photograph of the owner of the card which is stored on the database for ensuring that the card has not been tampered with, the apparatus withholding the card from the user if the photograph on the card does not match the photograph stored in the database.

7. An apparatus for verifying an authorized user of a credit/identification card including a surface having a strip thereon which has information germane to the owner of the card, such as an identification number and other personal data, and at least one fingerprint thereon of the owner of the card, said apparatus a comprising:

an information strip scanning device for scanning the information strip of the card;

means for comparing the information contained in the strip to information of the owner stored on at least one accessible database in communication with said apparatus, the apparatus withholding the card from the user if the information on the card does not match the information germane to the owner of the card which is stored in the database;

a graphic scanning device for scanning the surface of the card, said graphic scanning device digitizing the surface of the card by imaging every line thereof;

means for converting the image of the surface of the card to a digital numeric sequence;

means for comparing the surface of the card as scanned by said graphic scanning device and converted to a digital numeric sequence by said converting means to a digital numeric sequence stored in said database for determining whether the card has been tampered with, the apparatus withholding the card from the user if the surface of the card does not match the surface of the card stored by the database;

a fingerprint scanning device having a pad upon which the user of the card presses with a finger for obtaining a fingerprint of the user, said fingerprint scanning device scanning the fingerprint of the user; and means for comparing the fingerprint of the user to said fingerprint on the card and to a fingerprint of the owner of the card in the database to ensure authorized use of the card, the apparatus withholding the card from the user if the fingerprint scanned by the fingerprint scanning device does not match the fingerprints on the card and in the database, whereby, upon matching the user's fingerprint to the fingerprints on the card and in the database for ensuring the user of the card is the owner of the card, said apparatus allowing the user to use the card for a desired purpose, said apparatus further comprising means for recording the fingerprint of the user of the card in the event the fingerprint of the user does not match the fingerprint on the card or the fingerprint of the owner of the card.

8. The apparatus as set forth in claim 7 further comprising:

a microphone;

means for recording the user of the card's voice after the user has spoken into the microphone for obtaining a voice print of the user; and means for comparing the user's voice print to a voice print of the owner of the card which is stored in the database, the apparatus withholding the card from the user if the user's voice does not match the voice print of the owner stored in the database.

9. The apparatus as set forth in claim 8 further comprising:

a retinal scanning device for obtaining a retinal print of the user after the user looks into the retinal scanning device; and means for comparing the user's retinal print to a retinal print of the owner of the card which is stored in the database, the apparatus withholding the card from the user if the user's retinal print does not match the retinal print of the owner stored in the database.

10. The apparatus as set forth in claim 9 further comprising:

a scanning device for scanning a photograph of the user on the card; and means for comparing the photograph as scanned by the scanning device to a photograph of the owner of the card which is stored on the database for ensuring that the card has not been tampered with, the apparatus withholding the card from the user if the photograph on the card does not match the photograph stored in the database.

11. The apparatus as set forth in claim 9 further comprising:

a scanning device for scanning a photograph of the user on the card; and means for comparing the photograph as scanned by the scanning device to a photograph of the owner of the card which is stored on the database for ensuring that the card has not been tampered with, the apparatus withholding the card from the user if the photograph on the card does not match the photograph stored in the database, said voice print, retinal print and photograph comparing means comprising a microprocessor.

12. The apparatus as set forth in claim 7 further comprising:

a retinal scanning device for obtaining a retinal print of the user after the user looks into the retinal scanning device; and means for comparing the user's retinal print to a retinal print of the owner of the card which is stored in the database, the apparatus withholding the card from the user if the user's retinal print does not match the retinal print of the owner stored in the database.

13. The apparatus as set forth in claim 7 further comprising:

a scanning device for scanning a photograph of the user on the card; and means for comparing the photograph as scanned by the scanning device to a photograph of the owner of the card which is stored on the database for ensuring that the card has not been tampered with, the apparatus withholding the card from the user if the photograph on the card does not match the photograph stored in the database.

14. The apparatus as set forth in claim 7 further comprising an encryption device for encrypting and decrypting data transmissions between said apparatus and said database, said database including a corresponding encryption device.

15. A method of verifying an authorized user of a credit/identification card comprising the steps of:

reading an information strip on the card, said information strip having information germane to the owner of the card;

comparing said information to a corresponding set of information stored in a remote database, whereby said card is withheld if said information does not match said corresponding set of information stored in the remote database;

obtaining a digitized image of a surface of said card;

comparing said obtained digitized image of said card to a corresponding digitized image of said card stored in said remote database, whereby said card is withheld if said obtained digitized image does not match said corresponding digitized image stored in said remote database;

obtaining an image of a physical attribute of the user of the card;

comparing said obtained image of said physical attribute of said user to a corresponding image of said physical attribute of said owner stored in said remote database, whereby said card is withheld if said obtained image of said physical attribute does not match said stored image of said physical attribute, and further whereby said obtained image of said physical attribute is recorded if said obtained image of said physical attribute does not match said stored image of said physical attribute, said user being allowed to conduct a desired electronic transaction if said obtained image of said physical attribute of said user matches said stored image of said physical attribute of said owner.

16. The method of claim 15 wherein said physical attribute comprises a fingerprint.

17. The method of claim 16 further comprising the step of obtaining an image of a second physical attribute of said user, and comparing said obtained image of said second physical attribute of said user to a corresponding image of a second physical attribute of said owner stored in said remote database, whereby said card is withheld if said obtained image of said second physical attribute does not match said corresponding stored image of said second physical attribute, and further whereby said obtained image of said second physical attribute is recorded if said obtained image of said second physical attribute does not match said corresponding stored image of said second physical attribute, said user being allowed to conduct a desired electronic transaction if said obtained image of said second physical attribute of said user matches said stored image of said second physical attribute of said owner.

18. The method of claim 17 wherein said second physical attribute comprises a voice print.

19. The method of claim 17 wherein said second physical attribute comprises a retinal print.

20. The method of claim 15 further comprising the step of encrypting transmissions of said information to and from said remote database.

21. The method of claim 15 wherein said physical attribute comprises a voice print.

22. The method of claim 15 wherein said physical attribute comprises a retinal print.

23. Apparatus for verifying an authorized user of a credit/identification card comprising:

means for reading an information strip on said card, said information strip having information germane to the owner of the card;

means for communicating with a remote database having corresponding set of information germane to said owner of said card;

means for comparing said information to said corresponding set of information stored in said remote database, said card being withheld by said apparatus if said information does not match said corresponding set of information stored in the remote database;

means for obtaining a digitized image of a surface of said card;

means for comparing said obtained digitized image of said card to a corresponding digitized image of said card stored in said remote database, said card being withheld by said apparatus if said obtained digitized image does not match said corresponding digitized image stored in said remote database;

means for obtaining an image of a physical attribute of the user of the card;

means for comparing said obtained image of said physical attribute of said user to a corresponding image of said physical attribute of said owner stored in said remote database, said card being withheld by said apparatus if said obtained image of said physical attribute does not match said stored image of said physical attribute; and means for recording said obtained image of said physical attribute if said obtained image of said physical attribute does not match said stored image of said physical attribute, said user being allowed to conduct a desired electronic transaction if said obtained image of said physical attribute of said user matches said stored image of said physical attribute of said owner.

24. The apparatus of claim 23 wherein said physical attribute of said user comprises a fingerprint.

25. The apparatus of claim 24 further comprising means for obtaining an image of a second physical attribute of said user, and means for comparing said obtained image of said second physical attribute of said user to a corresponding image of a second physical attribute of said owner stored in said remote database, said card being withheld if said obtained image of said second physical attribute does not match said corresponding stored image of said second physical attribute, said apparatus still further comprising means for recording said obtained image of said second physical attribute if said obtained image of said second physical attribute does not match said corresponding stored image of said second physical attribute, said user being allowed to conduct a desired electronic transaction if said obtained image of said second physical attribute of said user matches said stored image of said second physical attribute of said owner.

26. The apparatus of claim 25 wherein said second physical attribute comprises a voice print.

27. The apparatus of claim 25 wherein said second physical attribute comprises a retinal print.

28. The apparatus of claim 23 further comprising means for encrypting data transmissions between said apparatus and said remote database.

29. The apparatus of claim 23 wherein said physical attribute of said user comprises a voice print.

30. The apparatus of claim 23 wherein said physical attribute of said user comprises a retinal print.

31. A method for conducting a secure electronic transaction using a credit/identification card comprising the steps of:

reading an information strip on the card, said information strip having information germane to the owner of the card;

comparing said information to a corresponding set of information stored in a remote database, whereby said card is withheld if said information does not match said corresponding set of information stored in the remote database;

obtaining an image of a physical attribute of the user of the card;

comparing said obtained image of said physical attribute of said user to a corresponding image of said physical attribute of said owner stored in said remote database, whereby said card is withheld if said obtained image of said physical attribute does not match said stored image of said physical attribute, and further whereby said obtained image of said physical attribute is recorded if said obtained image of said physical attribute does not match said stored image of said physical attribute; and selecting a desired electronic transaction from a predetermined menu system, said user being allowed to conduct a desired electronic transaction if said obtained image of said physical attribute of said user matches said stored image of said physical attribute of said owner.

32. The method of claim 31 wherein said physical attribute comprises a fingerprint.

33. The method of claim 32 further comprising the step of obtaining an image of a second physical attribute of said user, and comparing said obtained image of said second physical attribute of said user to a corresponding image of a second physical attribute of said owner stored in said remote database, whereby said card is withheld if said obtained image of said second physical attribute does not match said corresponding stored image of said second physical attribute, and further whereby said obtained image of said second physical attribute is recorded if said obtained image of said second physical attribute does not match said corresponding stored image of said second physical attribute, said user being allowed to conduct a desired electronic transaction if said obtained image of said second physical attribute of said user matches said stored image of said second physical attribute of said owner.

34. The method of claim 33 wherein said second physical attribute comprises a voice print.

35. The method of claim 33 wherein said second physical attribute comprises a retinal print.

36. The method of claim 31 further comprising the step of encrypting transmissions of said information to and from said remote database.

37. The method of claim 31 wherein said physical attribute comprises a voice print.

38. The method of claim 31 wherein said physical attribute comprises a retinal print.

39. Apparatus for conducting a secure electronic transaction using a credit/identification card comprising:

means for reading an information strip on said card, said information strip having information germane to the owner of the card;

means for communicating with a remote database having corresponding set of information germane to said owner of said card;

means for comparing said information to said corresponding set of information stored in said remote database, said card being withheld by said apparatus if said information does not match said corresponding set of information stored in the remote database;

means for obtaining an image of a physical attribute of the user of the card;

means for comparing said obtained image of said physical attribute of said user to a corresponding image of said physical attribute of said owner stored in said remote database, said card being withheld by said apparatus if said obtained image of said physical attribute does not match said stored image of said physical attribute; and means for recording said obtained image of said physical attribute if said obtained image of said physical attribute does not match said stored image of said physical attribute, said user being allowed to conduct a desired electronic transaction if said obtained image of said physical attribute of said user matches said stored image of said physical attribute of said owner.

40. The apparatus of claim 39 wherein said physical attribute of said user comprises a fingerprint.

41. The apparatus of claim 40 further comprising means for obtaining an image of a second physical attribute of said user, and means for comparing said obtained image of said second physical attribute of said user to a corresponding image of a second physical attribute of said owner stored in said remote database, said card being withheld if said obtained image of said second physical attribute does not match said corresponding stored image of said second physical attribute, said apparatus still further comprising means for recording said obtained image of said second physical attribute if said obtained image of said second physical attribute does not match said corresponding stored image of said second physical attribute, said user being allowed to conduct a desired electronic transaction if said obtained image of said second physical attribute of said user matches said stored image of said second physical attribute of said owner.

42. The apparatus of claim 41 wherein said second physical attribute comprises a voice print.

43. The apparatus of claim 41 wherein said second physical attribute comprises a retinal print.

44. The apparatus of claim 39 further comprising means for encrypting data transmissions between said apparatus and said remote database.

45. The apparatus of claim 39 wherein said physical attribute of said user comprises a voice print.

46. The apparatus of claim 39 wherein said physical attribute of said user comprises a retinal print.

*47. A method for electronically verifying an authorized user of a credit/identification card comprising the steps of:*

*scanning an information strip of an identification card in a scanning apparatus to obtain an identification code assigned to an owner of a card;*

*locating an information file of the owner stored on a database in communicating with said scanning apparatus, said information file being located using said identification code;*

*obtaining an image of a physical attribute of the user of said identification card;*

*comparing said obtained image of the user of the card to an image of a corresponding physical attribute of the owner of the card stored in the information file of the owner of the card to positively identify the user of the card as the owner of the card whereby upon matching the user's image to the owner's corresponding image said user is authorized to use the card for a desired purpose; and*

*recording the image of the user of the card in the event the image of the physical attribute of the user does not match the corresponding image of the corresponding physical attribute of the owner of the card stored in the information file of the owner of the card.*

*48. The method as set forth in claim 47 further comprising the steps of obtaining an image of a second physical attribute of the user of said identification card;*

*comparing said second obtained image of the user of the card to a second image of a corresponding physical attribute of the owner of the card stored in the information file to further positively identify the user of the card as the owner of the card whereby upon matching the user's obtained images to the owner's corresponding images said user is authorized to use the card for a desired purpose; and*

*recording the obtained images of the user of the card in the event the images of the physical attributes of the user do not match the corresponding images of the corresponding physical attributes of the owner of the card stored in the information file of the owner of the card.*

*49. The method as set forth in claim 47 wherein said step of obtaining an image of a physical attribute of the user comprises obtaining a scanned image of a fingerprint of the user.*

*50. The method as set forth in claim 47 wherein said step of obtaining an image of a physical attribute of the user comprises obtaining a scanned image of a retinal print of the user.*

*51. The method as set forth in claim 47 wherein said step of obtaining an image of a physical attribute of the user comprises obtaining a scanned image of a retinal print of the user.*

*52. The method as set forth in claim 47 wherein said step of obtaining an image of a physical attribute of the user comprises obtaining a photographic image of the user's facial features.*

*53. The method as set forth in claim 48 wherein said steps of obtaining images of physical attributes of the user comprise the steps of obtaining a scanned image of a fingerprint of the user, and obtaining a second image of a retinal print of the user.*

*54. The method as set forth in claim 48 wherein said steps of obtaining images of physical attributes of the user comprise the steps of obtaining a scanned image of a fingerprint of the user, and obtaining a voice print of the user.*

*55. The method as set forth in claim 48 wherein said steps of obtaining images of physical attributes of the user comprise the steps of obtaining a scanned image of a retinal print of the user, and obtaining a voice print of the user.*

*56. The method as set forth in claim 47 further comprising the step of encrypting communication of said information to and from said remote database.*

*57. The method as set forth in claim 48 further comprising the step of encrypting communication of said information to and from said remote database.*

*58. The method as set forth in claim 47 further comprising the step of selecting a desired electronic transaction from a predetermined menu system when said user is authorized to use said card.*

*59. The method of claim 47 further comprising the step of comparing said recorded image of said physical attribute of the individual to a set of images of physical attributes of other individuals stored in a second database in an attempt to identify said individual.*

*60. An apparatus for verifying an authorized user of a credit/identification card including an information strip thereon which has information germane to the owner of the card including an identification code assigned to the owner of the card, said apparatus a comprising:*

*a scanning device for scanning the information strip of the card and obtaining said identification code from said information strip;*

*means for communicating with a remote database and for locating an information file on said database which corresponds to said identification code;*

*means for obtaining an image of a physical attribute of the user of the card;*

*means for comparing said obtained image of the user of the card to an image of a corresponding physical attribute of the owner of the card stored in the information file of the owner of the card to positively identify the user of the card as the owner of the card whereby upon matching the user's image to the owner's corresponding image said user is authorized to use the card for a desired purpose; and*

*means for recording the image of the user of the card in the event the image of the physical attribute of the user does not match the corresponding image of the corresponding physical attribute of the owner of the card stored in the information file of the owner of the card.*

*61. The apparatus as set forth in claim 60 wherein said means for obtaining an image of a physical attribute of the user comprises a fingerprint scanning device, and said stored image of a physical attribute of the owner comprises a stored image of a fingerprint of the owner of the card.*

*62. The apparatus as set forth in claim 60 wherein said means for obtaining an image of a physical attribute of the user comprises a microphone for obtaining a voice print of the user, and said stored image of a physical attribute of the owner comprises a stored voice print of the owner of the card.*

*63. The apparatus as set forth in claim 60 wherein said means for obtaining an image of a physical attribute of the user comprises a retinal scanning device for obtaining a retinal print of the user, and said stored image of a physical attribute of the owner comprises a stored image of a retinal print of the owner of the card.*

*64. The apparatus as set forth in claim 60 wherein said means for obtaining an image of a physical attribute of the user comprises a photo scanning device, and said stored image of a physical attribute of the owner comprises a stored photo image of facial attributes of the owner of the card.*

*65. The apparatus as set forth in claim 60 further comprising an encryption device for encrypting and decrypting data transmissions between said apparatus and said database, said database including a corresponding encryption device.*

*66. A method for electronically verifying the identity of an individual attempting to electronically gain access to a computer system comprising the steps of:*

*obtaining an identification code assigned to an owner of an account on said computer system;*

*locating an information file of said owner stored on a database in communication with said computer system, said information file being located using said identification code;*

*obtaining an image of a physical attribute of said individual;*

*comparing said obtained image of said individual to an image of a corresponding physical attribute of said owner of said account stored in the information file of the owner of the account to positively identify the individual as the owner of the identification code whereby upon matching the individual's image to the owner's corresponding image said user is authorized to gain access to said computer system; and*

*recording the image of the individual in the event the image of the physical attribute of the individual does not match the corresponding image of the corresponding physical attribute of the owner of the identification code stored in the information file of the owner of the account.*

*67. The method as set forth in claim 66 wherein said step of obtaining an image of a physical attribute of the user comprises obtaining a scanned image of a fingerprint of the user.*

*68. The method as set forth in claim 66 wherein said step of obtaining an image of a physical attribute of the user comprises obtaining a scanned image of a retinal print of the user.*

*69. The method as set forth in claim 66 wherein said step of obtaining an image of a physical attribute of the user comprises obtaining a voice print of the user.*

*70. The method of claim 66 further comprising the step of comparing said recorded image of said physical attribute of the individual to a set of images of physical attributes of other individuals stored in a second database in an attempt to identify said individual.*

* * * * *